No. 849,039. PATENTED APR. 2, 1907.
E. W. BASSICK & C. S. BARNARD.
TOILET SCREW NUT.
APPLICATION FILED OCT. 3, 1906.

WITNESSES
H. A. Lamb
S. W. Atherton

INVENTORS
Edgar W. Bassick and
Charles S. Barnard
BY
A. M. Wooster
ATTORNEY

UNITED STATES PATENT OFFICE.

EDGAR W. BASSICK AND CHARLES S. BARNARD, OF BRIDGEPORT, CONNECTICUT, ASSIGNORS TO THE BURNS, SILVER AND COMPANY, OF BRIDGEPORT, CONNECTICUT, A CORPORATION OF CONNECTICUT.

TOILET SCREW-NUT.

No. 849,039.  Specification of Letters Patent.  Patented April 2, 1907.

Application filed October 3, 1906. Serial No. 337,223.

*To all whom it may concern:*

Be it known that we, EDGAR W. BASSICK and CHARLES S. BARNARD, citizens of the United States, residing at Bridgeport, county of Fairfield, State of Connecticut, have invented a new and useful Toilet Screw-Nut, of which the following is a specification.

This invention relates to nuts, particularly of that type employed in connection with a bolt or screw for connecting two parts, such as a toilet-mirror frame and the supporting-uprights therefor, and which usually permit the mirror to be swung to different positions, such devices being commonly referred to as toilet screw-nuts. It is to be understood, however, that we do not limit ourselves to the use of the device in the manner described, since it is obviously capable of various other uses, such as for connecting parts of swinging brackets, towel-racks, &c.

One of the objects of the present invention is to provide a device of this character in which the washer that is usually placed on the screw or bolt to space the swinging member from its support may be dispensed with, a portion of the nut serving the purpose of such ordinary washer.

Another object of the invention is to provide an improved nut, which is simple and cheap in construction, easily inserted in place, and capable of ready removal, and the parts of which cannot become separated from each other, whereby the said parts may be made and sold as a complete article of manufacture.

To these ends, the invention consists in the construction and combination of parts substantially as hereinafter described and claimed.

Figure 1:
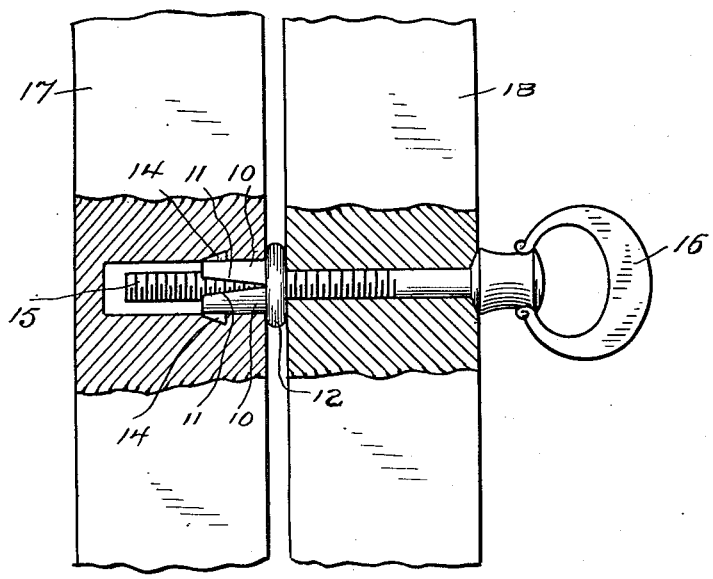
Figure 2:
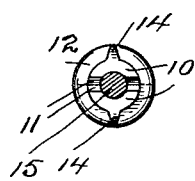

In the accompanying drawings, forming a part of this specification, Figure 1 is a side elevation of a nut embodying the invention, a bolt or screw being shown in operative position relatively to the nut, said figure also representing broken-out portions of two members, such as a mirror-frame and a supporting-bracket connected by the nut and bolt. Fig. 2 represents an end view of the nut looking from the left of Fig. 1 and showing the bolt in section, and Fig. 3 represent a longitudinal section of the nut with the two threaded members thereof collapsed.

Similar reference characters indicate the same or similar parts in all the views.

Figure 3:
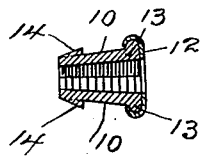

The nut comprises two internally-threaded wings 10, which are substantially semicircular in cross-section, the edges being beveled or inclined endwise, as indicated at 11 in Fig. 1, to permit the wings to assume the relative positions shown in Fig. 3, with the threaded bore tapered. The wings, instead of being integral at one end, are entirely separate, but are held in hinged relation to each other by a disk or washer 12. Said disk is preferably made of sheet metal and is in the form of a circular cap or ring, having a central hole for the screw or bolt, the edge or periphery of the disk or cap being bent over and engaging flanges 13 at the larger ends of the wings. Said flanges fit the internal groove formed by the bent-over edge of the ring-shaped disk, so as to practically form a hinge connection, whereby said wings may assume the relative positions shown in either Fig. 1 or Fig. 3. The wings may be, and preferably are, formed with spurs 14 to engage the walls of a hole bored in wood member, such as the frame of a toilet-mirror.

A suitably-formed screw or bolt 15, having a handle or finger-piece 16, is represented in Fig. 1, in which figure the member 17 may be supposed to be a portion of the frame of a mirror and 18 a portion of one of the supporting-uprights for such mirror.

In assembling, the nut is inserted in a hole formed in the member 17, such hole being preferably of a diameter which will readily receive the nut while the wings are collapsed, as shown in Fig. 3, the head of the nut, consisting of the ring-shaped disk and the flanges of the wings, remaining in the position shown in Fig. 1 and serving the same purpose for which a spacing-washer has usually been employed. The bolt is then inserted through a hole in the member 18 and engaged with the nut. Turning the screw in causes it to expand the wings of the nut, so that they will firmly engage the walls of the hole in member 17 by means of the spurs 14. The effort required to expand the wings by the entering end of the bolt is much less than would be the case if the wings were integral at one end, because their hinge connection permits them to open freely. Furthermore, if it be desired to separate the members 17 18 the removal of the bolt will leave the nut so that it can be quite readily worked out of its hole, there being then no separate washer to be lost or mislaid.

The construction of the nut is such, as will be readily understood, that although the wings are not rigidly connected they cannot become separated from each other at any time, and therefore the nut can be handled as a complete article with as much facility as though it consisted of an integral piece of metal, and still it can be applied to place for use or removed therefrom with much greater ease than a solid structure. Furthermore, the device as a complete article of manufacture comprises not only a nut for engaging the bolt or screw, but also a washer for properly spacing the members 17 and 18.

As shown in Fig. 3, the members 10 of the nut when their edges are in contact with each other may be readily inserted in a hole that has been bored in the member 17 with little or no driving pressure. This is because the diameter of the nut at a point taken through the spurs 14 is but slightly greater than the diameter of the nut adjacent to the flanges 13, and said spurs are, of course, pointed. Therefore when the nut is to be inserted in a hole in member 17 it is simply pushed in while the parts of the nut are in the position shown in Fig. 3. Then the entrance of the bolt or screw 15 between the internally-threaded members 10 of the nut spreads said members 10 without encountering resistance to the entrance of the bolt other than what may be required to force the pointed spurs 14 outward into the walls of the hole in the member 17.

Having thus described our invention, we claim—

1. As an article of manufacture, a combined nut and washer comprising a plurality of internally-threaded members each having a flange at one end, and a ring-shaped disk embracing the flanges of said members and hingedly connecting them, the edges of said members being beveled or tapered whereby the insertion of the end of a bolt will swing said members apart.

2. As an article of manufacture, a combined nut and washer comprising a plurality of internally-threaded members each having a flange at one end and each having a spur, and a ring-shaped disk embracing the flanges of said members and hingedly connecting them, the edges of said members being beveled or tapered whereby the insertion of the end of a bolt will swing said members apart, the diameter of the nut at a point taken through said spurs being substantially not greater than the diameter of the nut adjacent to said flanges.

In testimony whereof we affix our signatures in presence of two witnesses.

EDGAR W. BASSICK.
CHARLES S. BARNARD.

Witnesses:
ALICE M. COWLES,
W. F. BURNS.